(12) United States Patent
Sahai et al.

(10) Patent No.: US 12,393,635 B2
(45) Date of Patent: Aug. 19, 2025

(54) DECENTRALIZED GRAPH CLUSTERING USING THE SCHRODINGER EQUATION

(71) Applicants: RAYTHEON COMPANY, Waltham, MA (US); RAYTHEON BBN TECHNOLOGIES CORP., Cambridge, MA (US)

(72) Inventors: Tuhin Sahai, San Francisco, CA (US); Hari Kiran Krovi, Lexington, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 0 days.

(21) Appl. No.: 17/843,863

(22) Filed: Jun. 17, 2022

(65) Prior Publication Data
US 2023/0409643 A1    Dec. 21, 2023

(51) Int. Cl.
*G06F 17/30*    (2006.01)
*G06F 16/901*   (2019.01)
*G06F 16/906*   (2019.01)

(52) U.S. Cl.
CPC ........ *G06F 16/906* (2019.01); *G06F 16/9024* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 7,743,061 B2 * | 6/2010 | Jones | ...................... | G06F 16/30 707/741 |
| 7,856,544 B2 * | 12/2010 | Schenfeld | ............. | G06F 9/5061 709/231 |
| 8,266,121 B2 * | 9/2012 | Roitblat | ................... | G06F 16/35 707/694 |
| 8,516,029 B1 * | 8/2013 | Koutis | .................... | G06F 17/12 708/446 |
| 10,817,543 B2 * | 10/2020 | He | .......................... | G06Q 30/02 |

(Continued)

FOREIGN PATENT DOCUMENTS

WO    WO 2017/0189052 A1    11/2017

OTHER PUBLICATIONS

Jiag Jiang, "An Introduction to Spectral Graph Theory", 2012, 16 pages.*

(Continued)

*Primary Examiner* — Hung D Le
(74) *Attorney, Agent, or Firm* — CANTOR COLBURN LLP

(57) ABSTRACT

A method for node cluster assignment in a graph includes identifying neighboring nodes of a first node in the graph, calculating one or more elements of a graph Laplacian of the graph, the one or more elements of the graph Laplacian corresponding to the first node and the neighboring nodes, initializing a first wavefunction associated with the first node with an initial value, evolving the first wavefunction associated with the first node over time based on the initial value, the one or more elements of the graph Laplacian, and previous states of wavefunctions of the neighboring nodes to generate a time-evolved wavefunction vector, and identifying a cluster assignment of the first node based on the time-evolved wavefunction vector.

20 Claims, 5 Drawing Sheets

(56) References Cited

U.S. PATENT DOCUMENTS

| | | | | |
|---|---|---|---|---|
| 2006/0290693 | A1* | 12/2006 | Zhou | G06T 13/20 345/423 |
| 2007/0165949 | A1* | 7/2007 | Sinop | G06T 7/11 382/173 |
| 2007/0285426 | A1* | 12/2007 | Matina | G06T 11/206 345/440 |
| 2011/0172930 | A1* | 7/2011 | Pancoska | G16B 30/00 702/20 |
| 2013/0328870 | A1* | 12/2013 | Grenfell | G06T 15/04 345/582 |
| 2015/0030231 | A1* | 1/2015 | Porikli | G06T 7/162 382/173 |
| 2015/0120623 | A1* | 4/2015 | Morara | G06N 5/02 706/12 |
| 2016/0098643 | A1* | 4/2016 | Tsomokos | H04L 67/02 706/11 |
| 2016/0314184 | A1* | 10/2016 | Bendersky | G06F 16/35 |
| 2018/0293274 | A1* | 10/2018 | Vandiver | G06F 16/24542 |
| 2018/0342030 | A1* | 11/2018 | Magleby | G06F 17/10 |
| 2018/0352414 | A1* | 12/2018 | Zhang | H04W 8/14 |
| 2018/0357770 | A1* | 12/2018 | Choi | G06T 7/13 |
| 2019/0026645 | A1 | 1/2019 | Correll et al. | |
| 2019/0251480 | A1* | 8/2019 | Garcia Duran | G06N 20/20 |
| 2019/0332963 | A1* | 10/2019 | Wong | G06N 20/00 |
| 2020/0074080 | A1* | 3/2020 | Srinivasagopalan | G06F 16/2462 |
| 2020/0074341 | A1* | 3/2020 | He | G06N 5/01 |
| 2020/0409791 | A1* | 12/2020 | Devriendt | G06F 11/1076 |
| 2021/0381056 | A1* | 12/2021 | Hamel | G16B 40/00 |
| 2022/0166848 | A1* | 5/2022 | Banerjee | H04L 67/535 |

OTHER PUBLICATIONS

Fiedler, M., "A property of eigenvectors of nonnegative symmetric matrices and its application to graph theory," Czechoslovak Mathematical Journal, vol. 25 (1975) No. 4, pp. 619-633.

Hein, M., et al., "From Graphs to Manifolds—Weak and Strong Pointwise Consistency of Graph Laplacians," COLT 2005, 16 pages.

Horaud, R., "A Short Tutorial on Graph Laplacians, Laplacian Embedding, and Spectral Clustering," Graph Laplacian Tutorial, 43 pages.

Kac, M., "Can One Hear the Shape of a Drum?," American Mathematical Monthly, 1966, 23 pages.

Kempe D., et al., "A Decentralized Algorithm for Spectral Analysis," ScienceDirect, Journal of Computer and System Sciences, 74 (2008) pp. 70-83.

Klus, S., et al., "An efficient algorithm for the parallel solution of high-dimensional differential equations," Journal of Computational and Applied Mathematics, (2011), 10 pages.

Von Luxburg, Ulrike, "A Tutorial on Spectral Clustering," Max Planck Institute for Biological Cybernetics, arXiv:0711.0189v1, [cs.DS] Nov. 1, 2007, 32 pages.

Sahai, T., et al., "Hearing the Clusters of a Graph: A Distributed Algorithm," United Technologies Research Center, arXiv:0911.4729v6 [cs.DM], Apr. 18, 2011, 13 pages.

Arute, et al. "Quantum supremacy using a programmable superconducting processor". Nature, vol. 574 (7779): pp. 505-510, Oct. 24, 2019.

Bian, et al. "Solving SAT and MaxSAT with a Quantum Annealer: Foundations and a Preliminary Report" International Symposium on Frontiers of Combining Systems, pp. 153-171. Springer, 2017.

Boghosian, et al. "Simulating quantum mechanics on a quantum computer" Physica D: Nonlinear Phenomena, 120 (1-2):30-42, 1998.

Bui, et al. "Finding good approximate vertex and edge partitions is NP-hard". Information Processing Letters, 42 (3):153-159, May 25, 1992.

Cerf, et al. "Monte Carlo simulation of quantum computation". Mathematics and Computers in Simulation, 47 (2-5): pp. 143-152, 1998.

D-Wave Inc. D-Wave's Ocean Software, 2020. [retrieved on Nov. 4, 2024 (Nov. 4, 2024)]. Retrieved from the internet:, URL: https://docs.ocean.dwavesys.com/en/stable/getting_started.html, 5 pages.

Farhi, et al. "Quantum Supremacy through the Quantum Approximate Optimization Algorithm" arXiv preprint arXiv:1602.07674, (2016), 23 pages, Oct. 21, 2019.

Ferrante, et al. "Application of Model-Based Safety Assessment to the Validation of Avionic Electrical Power Systems". In International Symposium on Model-Based Safety and Assessment, pp. 243-254. Springer, 2017.

John Preskill, "Quantum Computing in the NISQ era and beyond". Institute for Quantum Information and Matter and Walter Burke Institute for Theoretical Physics, California Institute of Technology, Quantum, Jul. 30, 2018 (Based on a Keynote Address at Quantum Computing for Business, Dec. 5, 2017) 20 pages.

Johnson, et al. "Quantum annealing with manufactured spins". Nature, vol. 473(7346):194-198, May 12, 2011.

Kempe, et al., "A decentralized algorithm for spectral analysis". Journal of Computer and System Sciences, 74(1):70-83, 2008.

Luxburg, Ulrike von, "A tutorial on spectral clustering". Statistics and Computing, 17 :395-416,(2007).

Nuzzo, et al. "Optimized Selection of Reliable and Cost-Effective Safety-Critical System Architectures". IEEE Transactions on Computer-Aided Design of Integrated Circuits and Systems, vol. 39, No. 10, Oct. 2020. pp. 2109-2123.

Sahai, et al. "Hearing the clusters of a graph: A distributed algorithm". Automatica, 48(1):15-24, 2012.

Sahai, et al. "Uncertainty as a stabilizer of the head-tail ordered phase in carbon-monoxide monolayers on graphite". Physical Review B, 80(11):115413-1-115413-6, May 2009.

Sahai, et al. "Wave Equation Based Algorithm for Distributed Eigenvector Computation", 49th IEEE Conference on Decision and Control (CDC), pp. 7308-7315. IEEE, Dec. 15-17, 2010.

Sahai, et al. Uncertainty quantification in hybrid dynamical systems Journal of Computational Physics 237 (2013) 411-427.

Vyskocil, et al. "Embedding Inequality Constraints for Quantum Annealing Optimization". In International workshop on quantum technology and optimization problems, pp. 11-22. Springer, 2019.

Yony Bresler, "Stochastic simulations of quantum computing". McGill University. A thesis submitted to McGill University in partial fulfillment of the requirements of the degree of Master of Science, Aug. 2011, 82 pages.

Abstract of D. Wagner and F. Wagner. Between min cut and graph bisection. In Proceedings of the 18th International Symposium on Mathematical Foundations of Computer Science (MFCS), pp. 744-750, 1993.

D. Wagner and F. Wagner. Between min cut and graph bisection. In Proceedings of the 18th International Symposium on Mathematical Foundations of Computer Science (MFCS), pp. 744-750, 1993. Full Book.

Shimon Even. Graph algorithms. Cambridge University Press, 2011. Full Book.

Thomas H Cormen, Charles E Leiserson, Ronald L Rivest, and Clifford Stein. Introduction to algorithms. MIT press, 2009. Full Book.

\* cited by examiner

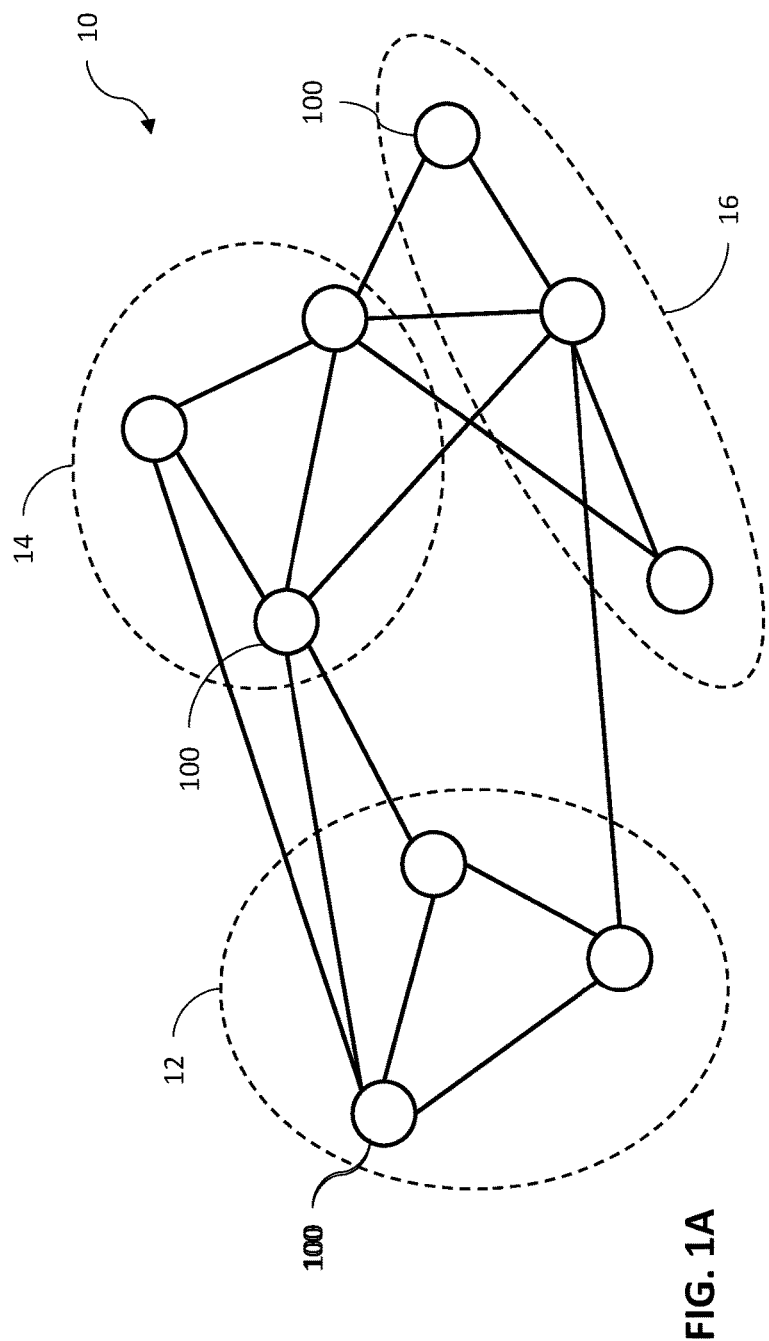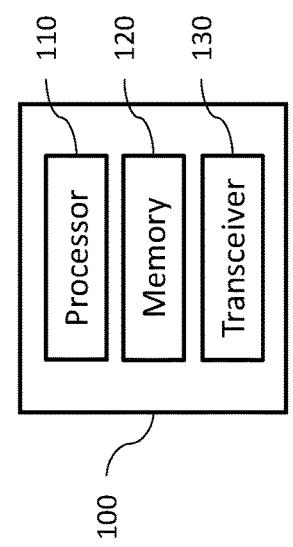
FIG. 1A
FIG. 1B

DECENTRALIZED GRAPH CLUSTERING USING THE SCHRODINGER EQUATION

FIELD

Embodiments of the present invention relate to the field of graph clustering.

BACKGROUND

Algorithms for graph analysis have a wide variety of applications such as routing, pattern recognition, database searches, network layout, and internet page ranking. Although some of the problems in these area can be solved efficiently on present day computing devices, several graph analysis problems are computationally intractable. For example, the problem of partitioning graphs into equal size clusters while minimizing the weights of cut edges arises in a range of settings such as social anthropology, gene networks, protein sequences, sensor networks, computer graphics, and internet routing algorithms. To avoid unbalanced cuts, size restrictions are typically placed on the clusters; instead of minimizing inter-connection strength, if one minimizes the ratio of the inter-connection strength to the size of individual clusters, the problem becomes NP-complete. In fact, the approximation problem is also NP-complete.

The above information disclosed in this Background section is only for enhancement of understanding of the background of the invention and therefore it may contain information that does not form the prior art that is already known to a person of ordinary skill in the art.

SUMMARY

Aspects of some embodiments of the present invention are directed to a distributed computing system for performing node cluster assignment in undirected graphs and a method of using the same. In some embodiments, the distributed computing system includes a distributed set of node processors each of which utilize the Schrödinger wave equation to identify their corresponding cluster assignment based on their interaction with nearby nodes. That is, each node processor may identify the cluster assignment of the corresponding node with only localized knowledge of nearby nodes, and without knowledge of the entire graph.

According to embodiments of the present invention, there is provided a method for node cluster assignment in a graph, the method including: identifying neighboring nodes of a first node in the graph; calculating one or more elements of a graph Laplacian of the graph, the one or more elements of the graph Laplacian corresponding to the first node and the neighboring nodes; initializing a first wavefunction associated with the first node with an initial value; evolving the first wavefunction associated with the first node over time based on the initial value, the one or more elements of the graph Laplacian, and previous states of wavefunctions of the neighboring nodes to generate a time-evolved wavefunction vector; and identifying a cluster assignment of the first node based on the spectrum of the time-evolved wavefunction vector.

In some embodiments, the calculating the one or more elements of the graph Laplacian includes: calculating one or more elements of an adjacency matrix of the graph; calculating one or more elements of a diagonal degree matrix of the graph; and calculating the one or more elements of the graph Laplacian based on the one or more elements of the adjacency matrix and the one or more elements of the diagonal degree matrix.

In some embodiments, the initializing the first wavefunction associated with the first node with the initial value includes: generating a random value as the initial value; and assigning the initial value to a corresponding element of the first wavefunction at time zero.

In some embodiments, the method further includes: receiving, from the neighboring nodes, the previous states of the wavefunctions of the neighboring nodes.

In some embodiments, the evolving the first wavefunction over time is further based on an evolution parameter.

In some embodiments, the evolving the first wavefunction over time includes: calculating the first wavefunction at a second time $t_2$ via the following expression: $\psi(t_2, j) = \psi(t_1, j) + \sum_{k \in N(j)} i\beta L_{jk} \psi(t_1, k)$ where $\psi(t_2, j)$ and $\psi(t_1, j)$ represent the first wavefunction at the second time $t_2$ and first time $t_1$, respectively, $N(j)$ represents a set of nodes neighboring the first node $j$, $\beta$ represents an evolution parameter, and $L_{jk}$ represents an element of the graph Laplacian corresponding to the first node $j$ and a neighboring node $k$, and the second time $t_2$ is one time step $\Delta t$ greater than the first time $t_1$.

In some embodiments, the time-evolved wavefunction vector is expressed as $[\psi(0, j), \psi(\Delta t, j), \psi(2\Delta t, j) \ldots \psi(T_{max}, j)]$ where $\psi(t,j)$ represents a value of the first wavefunction of the first node $j$ at time $t$, $\Delta t$ represents an evolution time step, and $T_{max}$ represents a maximum evolution time.

In some embodiments, the identifying the cluster assignment of the first node includes: estimating eigenvalues and one or more scaled components of eigenvectors of the graph Laplacian based on the time-evolved wavefunction vector; and determining the number of clusters and the cluster assignment of the first node based on the eigenvalues and the one or more scaled components of eigenvectors of the graph Laplacian respectively.

In some embodiments, the estimating the eigenvalues and the one or more scaled components of the eigenvectors of the graph Laplacian includes: performing a Fourier transform of the time-evolved wavefunction vector to generate a frequency domain wavefunction; identifying frequencies of peaks of the frequency domain wavefunction; estimating the eigenvalues as corresponding to the frequencies of the peaks; and calculating the one or more scaled components of the eigenvectors based on coefficients of the frequencies of the peaks.

In some embodiments, the determining the cluster assignment of the first node includes: identifying a number of clusters of the graph based on the eigenvalues of the graph Laplacian; and assigning the first node to one of the clusters based on the eigenvectors of the graph Laplacian.

In some embodiments, the graph represents a distributed computational system, and each of the first node and the neighboring nodes includes an independent processor of the distributed computational system and a communication device.

According to embodiments of the present invention, there is provided a distributed computing system including: a plurality of computational nodes interconnected as a graph, a first node of the plurality of computational nodes including: a processor; and a processor memory local to the processor, the processor memory has stored thereon instructions that, when executed by the processor, cause the processor to perform: identifying neighboring nodes of a first node from among the plurality of computational nodes;

calculating one or more elements of a graph Laplacian of the graph, the one or more elements of the graph Laplacian corresponding to the first node and the neighboring nodes; initializing a first wavefunction associated with the first node with an initial value; evolving the first wavefunction associated with the first node over time based on the initial value, the one or more elements of the graph Laplacian, and previous states of wavefunctions of the neighboring nodes to generate a time-evolved wavefunction vector; and identifying a cluster assignment of the first node based on the spectrum of the time-evolved wavefunction vector.

In some embodiments, the calculating the one or more elements of the graph Laplacian includes: calculating one or more elements of an adjacency matrix of the graph; calculating one or more elements of a diagonal degree matrix of the graph; and calculating the one or more elements of the graph Laplacian based on the one or more elements of the adjacency matrix and the one or more of the diagonal degree matrix.

In some embodiments, the initializing the first wavefunction associated with the first node with the initial value includes: generating a random value as the initial value; and assigning the initial value to a corresponding element of the first wavefunction at time zero.

In some embodiments, the distributed computing system further includes:

receiving, from the neighboring nodes, the previous states of the wavefunctions of the neighboring nodes.

In some embodiments, the evolving the first wavefunction over time is further based on an evolution parameter.

In some embodiments, the evolving the first wavefunction over time includes: calculating the first wavefunction at a second time $t_2$ via the following expression: $\psi(t_2, j) = \psi(t_1, j) + \Sigma_{k \in N(j)} i\beta L_{jk} \psi(t_1, k)$ where $\psi(t_2, j)$ and $\psi(t_1, j)$ represent the first wavefunction at the second time $t_2$ and first time $t_1$, respectively, $N(j)$ represents a set of nodes neighboring the first node $j$, $\beta$ represents an evolution parameter, and $L_{jk}$ represents an element of the graph Laplacian corresponding to the first node $j$ and a neighboring node $k$, and the second time $t_2$ is one time step $\Delta t$ greater than the first time $t_1$.

In some embodiments, the time-evolved wavefunction vector is expressed as $[\psi(0, j), \psi(2\Delta t, j) \ldots \psi(Tmax, j)]$ where $\psi(t,j)$ represents a value of the first wavefunction of the first node $j$ at time $t$, $\Delta t$ represents an evolution time step, and Tmax represents a maximum evolution time.

In some embodiments, the identifying the cluster assignment of the first node includes: estimating eigenvalues and one or more scaled components of eigenvectors of the graph Laplacian based on the time-evolved wavefunction vector; and determining the number of clusters and the cluster assignment of the first node based on the eigenvalues and the one or more scaled components of the eigenvectors of the graph Laplacian, respectively.

In some embodiments, the graph represents a distributed computational system, and each of the first node and the neighboring nodes includes an independent processor of the distributed computational system and a communication device.

BRIEF DESCRIPTION OF THE DRAWINGS

The accompanying drawings, together with the specification, illustrate example embodiments of the present invention, and, together with the description, serve to explain the principles of the present invention.

FIG. 1A illustrates a schematic diagram of a distributed computing system including a plurality of interconnected nodes that are grouped into a number of clusters, according to some embodiments of the present disclosure.

FIG. 1B illustrates a schematic diagram of a node of the distributed computing system, according to some embodiments of the present disclosure.

DETAILED DESCRIPTION

Figure 2:
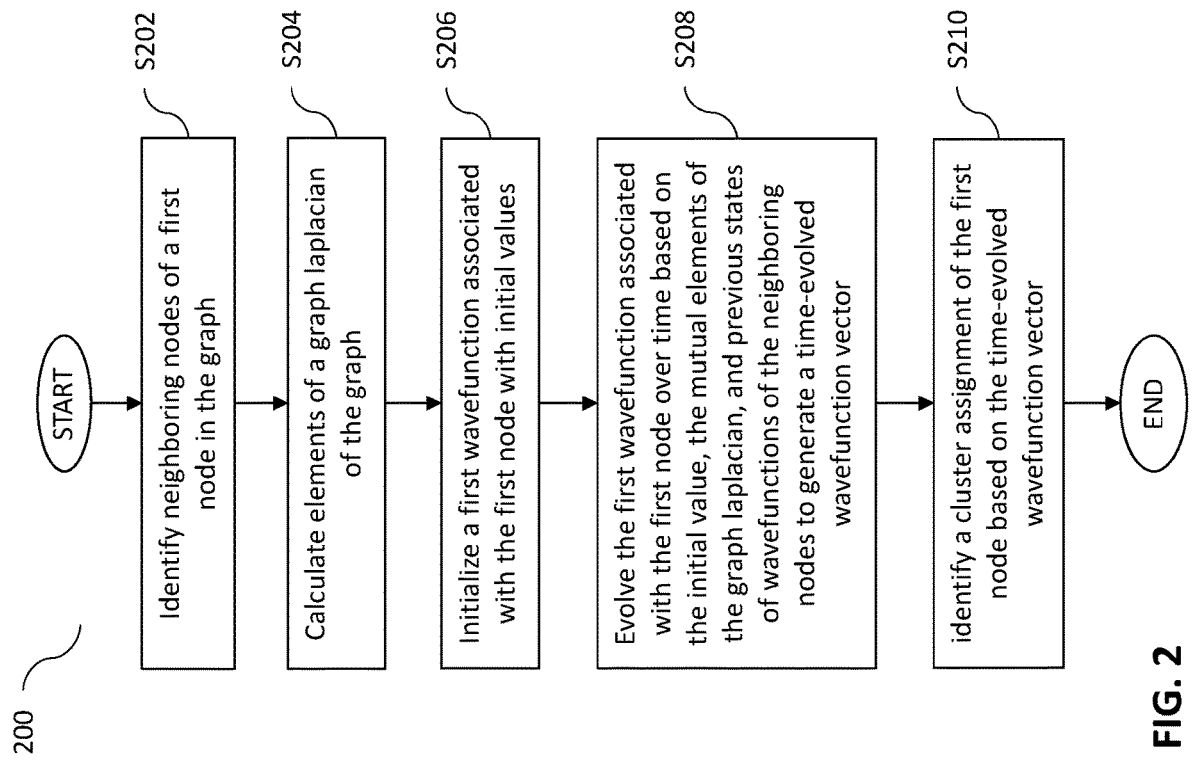
FIG. 2 illustrates a process of node cluster assignment in a graph, according to some embodiments of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

Data or graph clustering is a widely used technique for exploratory data analysis and has a wide range of applications from statistics and computer science to social sciences. The goal of clustering is to determine patterns (i.e., groups) in the data or graph. However, as the size of the data/graph grows, clustering can quickly become an intractable problem when using traditional approaches.

The systems and methods according to some embodiments of the present disclosure utilize the Schrödinger equation and its connection with the Laplacian of a graph for clustering large graphs and datasets, and significantly improve upon the clustering algorithms of the related art.

FIG. 1A illustrates a schematic diagram of a distributed computing system including a plurality of interconnected nodes that are grouped into a number of clusters, according to some embodiments of the present disclosure. FIG. 1B illustrates a schematic diagram of a node of the distributed computing system, according to some embodiments of the present disclosure.

Referring to FIGS. 1A-1B, in some embodiments, distributed computing system 10 includes a distributed network of interconnected nodes 100 that together represent a graph. Each node may interact with (e.g., be connected to and communicate with a number of neighboring nodes. Some or all of the nodes may not have any knowledge about the entire network. For example, each node 100 may only be aware of (e.g., have any information about) other nodes 100 that it interacts with (e.g., its neighboring nodes 100), and have no knowledge of remaining nodes in the system 10. Each node 100 may include a processor 110 to perform data processing, a memory 120 for storing data and instructions performed by the processor 110, and a communication device (e.g., a transceiver) 130 for communicating with one or more other nodes 100.

The nodes 100 may be organized (e.g., grouped) into a number of clusters (e.g., 12/14/16) based on the interaction strength between connected nodes, size of the clusters, etc. For example, nodes in a one cluster may have strong interaction with one another (i.e., strong intra-connection), while having weak interaction with nodes in other clusters (i.e., weak inter-connections). According to some embodiments, each node of the distributed computing system 10 is capable of independently determining its cluster assignment without knowledge of the entire network/graph and without the aid of a central computer with knowledge of the entire system 10.

In some examples, the distributed computed system 10 may be a constellation (i.e., graph) of satellites (i.e., nodes), each of which is in communication with a number of neighboring satellites. Teaming/grouping the satellites may aid in object (e.g., missile or meteor) tracking. In other examples, the distributed computed system 10 may be a swarm/network (i.e., graph) of unmanned aerial vehicle (UAV; e.g., drones) for which teaming/grouping may aid in rapid decision making in time evolving scenarios. The strength of the interaction between the satellites/UAVs may be the signal strength of the communication between interacting satellites/UAVs, the distance between interacting satellites/UAVs, or the like.

Graph decomposition may be performed via spectral clustering whereby nodes are assigned to clusters based on the signs of elements of the eigenvectors of the Laplacian matrix corresponding to increasing eigenvalues. The Laplacian of a graph may be derived based on an adjacency matrix that embodies how strongly each pair of nodes in the graph interact with one another. The interaction between two nodes of the system may be visually represented by an edge touching both nodes, and the interaction strength may be represented by the weight of the edge.

As in a distributed system 10, each node 110 may not have full knowledge of the system, one or more nodes 100 in the system 10 may not possess knowledge of the full Laplacian matrix of the graph. The decentralized graph clustering method according to some embodiments of the present disclosure utilizes spectral clustering, while exploiting the Laplace-Beltrami operator in the Schrödinger equation and its connection to the graph Laplacian, to allow nodes in a distributed system to independently identify their cluster assignments without full knowledge of the entire graph Laplacian.

The Schrödinger equation may be expressed as $$i\hbar \frac{\partial \psi}{\partial t} = \left[-\frac{\hbar^2}{2m}\Delta + V\right]\psi, \qquad \text{Eq. (1)}$$

where $\psi$ represents the wavefunction, V represents potential energy, m represents mass, $\hbar$ is the reduced planck constant, and $\Delta$ is the Laplace-Beltrami operator, which when discretized on the graph gives the graph Laplacian $$L = I - D^{-1}A \qquad \text{Eq. (2)}$$

In the graph Laplacian definition, A is the adjacency matrix of the graph where each element of the adjacency matrix indicates the interaction strength of the two corresponding nodes, D is the diagonal degree matrix where diagonal elements of the matrix are each the sum of the weight of all edges touching a node, and I is the identity matrix. Here, for an N node graph, the wavefunction $\psi$ is an N-dimensional vector at time t.

Using Equation 1, the discretized Schrödinger update equation on the graph may be expressed as, $$i\hbar[\psi(t+1) - \psi(t)] = \left[-\frac{\hbar^2}{2m}L + V\right]\psi(t), \qquad \text{Eq. (3)}$$

$$\psi(t+1) = \left[I + i\frac{\hbar}{2m}L - \frac{i}{\hbar}V\right]\psi(t)$$

The above update equation (Equation 3) corresponds to a local update equation at any node j on the graph, $$\psi(t+1, j) = \psi(t, j) + \sum_{k \in N(j)} i\left(\frac{\hbar}{2m}L_{jk} - \frac{1}{\hbar}V_{jk}\right)\psi(t, k), \qquad \text{Eq. (4)}$$

Where k and j are positive integers, $\mathcal{N}$ (j) are neighbors of node j (i.e., nodes that interact with/are connected to node j). Appropriate selection of potential energy can simplify this equation further. In some embodiments, the potential energy V is chosen to be real-valued (and not a complex value) such that it is proportional to L. The potential energy V may be expressed as, $$V = \alpha \hbar L \qquad \text{Eq. (5)}$$

where $$\alpha = \frac{\hbar}{2m} - \beta \qquad \text{Eq. (6)}$$

Here, $\beta$ is an evolution parameter whose value can be suitably chosen given a particular application. Using Equations 5 and 6, Equation 4 may be reduced to:

$$\psi(t+1,j) = \psi(t,j) + \sum_{k \in N(j)} i\beta L_{jk}\psi(t,k), \qquad \text{Eq. (7)}$$

Here, $\beta$ because node j has knowledge of the interaction strength between it and its neighbors, $L_{jk}$ is known to node j; therefore, the wavefunction $\psi$ for node j can be evolved over time to obtain the time-evolved wavefunction vector $[\psi(0), \ldots, \psi(T)]$ for node j. Performing a fast Fourier transform (FFT) operation on the time-evolved wavefunction vector $[\psi(0), \ldots, \psi(T)]$ yields spectral components whose peak frequencies that can be used to estimate the eigenvalues of the Laplacian and the corresponding coefficients of the peak frequencies can be used to determine the (scaled) components of the eigenvectors. Using spectral clustering, node j may determine the total number of clusters and its cluster assignment based on the eigenvalues and the j-th (scaled) components (e.g., the signs of such components) of the eigenvectors, respectively. Spectral clustering is described in further detail in Von Luxburg, Ulrike. "A tutorial on spectral clustering." Statistics and computing 17.4 (2007): 395-416, which is incorporated herein in its entirety.

As will be recognized by a person of ordinary skill in the art, because the computation of the Koopman operator effectively provides the same function as the FFT, anytime the disclosure herein references performing an FFT, such an operation may be substituted by the computation of the Koopman operator and its spectra.

The reason why performing FFT on the on the time-evolved wavefunction vector $[\psi(0), \ldots, \psi(T)]$ can yield the desired eigenvalues and eigenvectors can be demonstrated using the analysis below.

Using the assumptions of Equations 5 and 6, the discretized Schrödinger update formulation of Equation (3) can be reduced to:

$$\psi(t+1)=[I+i\beta L]\psi(t) \quad \text{Eq. (8)}$$

The initial wavefunction $\psi(0)$, which is an N-dimensional vector at time zero, may be expanded in terms of the eigenvectors of the Laplacian L in the form of $$\psi(0)=C_1v_1+C_2v_2+\ldots+C_nv_N \quad \text{Eq. (9)}$$

where $v_1$ to $V_N$ are the eigenvectors of the Laplacian, and $C_1$ to $C_n$ are the corresponding coefficients. This expansion is possible because the eigenvectors of L form a basis through which any vector (hence $\psi(0)$) may be expressed. With that as the initial wavefunction, and knowing that $Lv_j=\lambda_j v_j$, the solution of Equation 8 may be expressed using the eigenvalues $\lambda_j$ of L as $$\psi(t+1)=\Sigma_{j=1}^N C_j[1+i\beta\lambda_j]^{t+1}v_j \quad \text{Eq. (10)}$$

Generally, $0=\lambda_1 \leq \ldots \leq \lambda_N \leq 2$ and $v_1$ is an N-dimensional vector equal to $[1\ 1\ 1\ \ldots\ 1]^T$. Using Euler's formula, $$1+i\beta\lambda_j=\sqrt{1+(\beta\lambda_j)^2}(\cos(\omega_j)+i\sin(\omega_j)) \quad \text{Eq. (11)}$$

where $$\omega_j=\tan^{-1}(\beta\lambda_j) \quad \text{Eq. (12)}$$

As a result, the solution of Equation 10 may be reformulated as $$\psi(t+1) = \sum_{j=1}^N C_j\left[1+(\beta\lambda_j)^2\right]^{\frac{t+1}{2}}((\cos(t+1)\omega_j)+i\sin((t+1)\omega_j))v_j \quad \text{Eq. (13)}$$

Using this equation, one may generate the time-evolved wavefunction vector $[\psi(0), \ldots, \psi(T)]$. Performing FFT on this vector provides spectral components, and the frequencies $\omega_j$ of the peaks can be used to determine the eigenvalues $\lambda_j$ based on Equation 12. As the coefficients of the FFT spectral components may be expressed as $C_j(1+(\beta\lambda_j)^2)v_j$, the (scaled) eigenvectors $v_j$ may be calculated based on the eigenvalues $\mu_j$ and the magnitude of the corresponding peak at frequency $\omega_j$. Thus, performing FFT on the time-evolved wavefunction vector can yield the eigenvalues and scaled components of the eigenvectors of the graph Laplacian. In some examples, the increase in magnitude of the various frequencies may also be used to estimate the eigenvalues.

As shown in Equation 8, for evolution parameters $\beta$ greater than 1, the amplitude of the wavefunction only grows over time. To prevent this value from growing too large, which could complicate numerical computations, it is desirable to set evolution parameters $\beta$ to be as small as possible, while maintaining a detectable signature of the Laplacian in Equation 8 to allow for accurate estimation of the eigenvalues and scaled components (e.g., signs of the scaled components) of the eigenvectors of the Laplacian.

While the above description was based on a real-valued potential energy V, embodiments of the present disclosure are not limited thereto, and by allowing the potential energy to have a complex value(e.g., if $V=i\alpha\hbar L$), the update equation may not increase the magnitude of the signal as in Equations 7 and 8, which may simplify the computation of signal values.

FIG. 2 illustrates a process 200 of node cluster assignment in a graph, according to some embodiments of the present disclosure.

In some embodiments, a first node (e.g., node j) 100 of the graph 10 perform quantum-based cluster assignment by first identifying neighboring nodes of a first node in the graph (S202). These may be nodes that interact with (e.g., communicate with) the first node. The interaction of the first node with the neighboring nodes may be facilitated by the communication device 130 of the nodes 100.

The first node 100 calculates the elements $L_{jk}$ (where k E N(j)) of the graph Laplacian L of the graph 10, which correspond to the first node and the neighboring nodes (N(j); S204). The elements $L_{jk}$ may be calculated by first calculating the corresponding elements $A_{jk}$ and $D_{jk}$ of the adjacency matrix A and the diagonal degree matrix D and using Equation 2. However, embodiments of the present disclosure are not limited thereto, and the elements $L_{jk}$ may be provided to the first node 100. Here, each node in the graph constructs their own "row" of the adjacency matrix A and the diagonal degree matrix D, but these matrices may not be fully constructed by any node.

The first node 100 then initializes a corresponding element (i.e., a j-th element) of a first wavefunction (which is an N-dimensional vector) with an initial value (S206). In so doing, the first node 100 assigns a random value to the corresponding element $\psi(0, j)$ of the N-dimensional vector $\psi(0)$ at time zero.

Once the first wavefunction is initialized, the first node 100 evolves the first wavefunction over time based on the initial value of the first wavefunction $\psi(0, j)$, the elements $L_{jk}$ of the graph Laplacian corresponding to the first node and its neighboring nodes, an evolution parameter, and previous states of wavefunctions of the neighboring nodes to generate a time-evolved wavefunction vector (S208). The evolution may occur at discretized time steps of $\Delta t$ (also referred to as evolution time step). For example, at time $t_2$ the first wavefunction may be calculated as $$\psi(t_2,j)=\psi(t_1,j)+\Sigma_{k\in N(j)}\, i\beta L_{jk}\psi(t_1,k) \quad \text{Eq. (14)}$$

where $\psi(t_2, j)$ and $\psi(t_1, j)$ represent the first wavefunction at the second time $t_2$ and first time $t_1$. Here, the second time $t_2$ may be one time step $\Delta t$ greater than the first time $t_1$. The first node may receive the previous states of the wavefunctions $\psi(t_1, K)$ from its neighboring nodes.

The time-evolved wavefunction vector at node j may be expressed as $$[\psi(0,j),\psi(\Delta t,j),\psi(2\Delta t,j)\ldots\psi(T\max,j)] \quad \text{Eq. (15)}$$

where $\psi(t,j)$ represents a value of the first wavefunction of the first node j at time t and Tmax represents a maximum evolution time.

The first node 100 then identifies the cluster assignment of the first node based on the time-evolved wavefunction vector (S210). The cluster assignment includes estimating eigenvalues and the j-th scaled components of the eigenvectors of the graph Laplacian based on the spectrum of the time-evolved wavefunction vector (e.g., based on the coefficients of the Fourier transform); and determining the number of clusters and the cluster assignment of the first node based on the eigenvalues and the signs of the j-th scaled components of the eigenvectors of the graph Laplacian, respectively.

Estimating the eigenvalues and the j-th scaled components of the eigenvectors of the graph Laplacian may be done by performing a Fourier transform (e.g., FFT) of the time-evolved wavefunction vector to generate a frequency domain wavefunction, identifying frequencies $\psi_j$ of peaks of the frequency domain wavefunction, estimating the eigenvalues $\lambda_j$ based on the frequencies of the peaks (e.g., using Equation 12), and calculating the scaled components of the eigenvectors $v_j$ based on the coefficients of the frequencies that correspond to the eigenvalues The first node may then determine its cluster assignment by identifying the total number of clusters in the graph based on the eigenvalues of the graph Laplacian, and assigning the first node to one of the clusters based on its locally estimated scaled components (e.g., signs of such components) of the eigenvectors of the graph Laplacian.

The decentralized graph clustering method according to some embodiments of the present disclosure may have a time to convergence that is orders of magnitude faster than the approaches of the related art. Further, the Schrödinger update equation has a lower overhead when compared to update equations of the related art, which confers a computational advantage to the quantum-based cluster assignment of the present disclosure and makes it particularly useful in decentralized clustering of networks (e.g., sensor networks) that are resource limited. Further, the decentralized nature of the quantum-based clustering provides scalability which enables the clustering of large graphs and datasets.

Aspects of embodiments of the present disclosure are directed to a quantum-based clustering method for clustering on fault tolerant quantum computers. Further aspects are directed to a quantum-based method for noisy intermediate scale quantum (NISQ) systems using the quantum approximate optimization algorithm (QAOA) approach.

Figure 3:
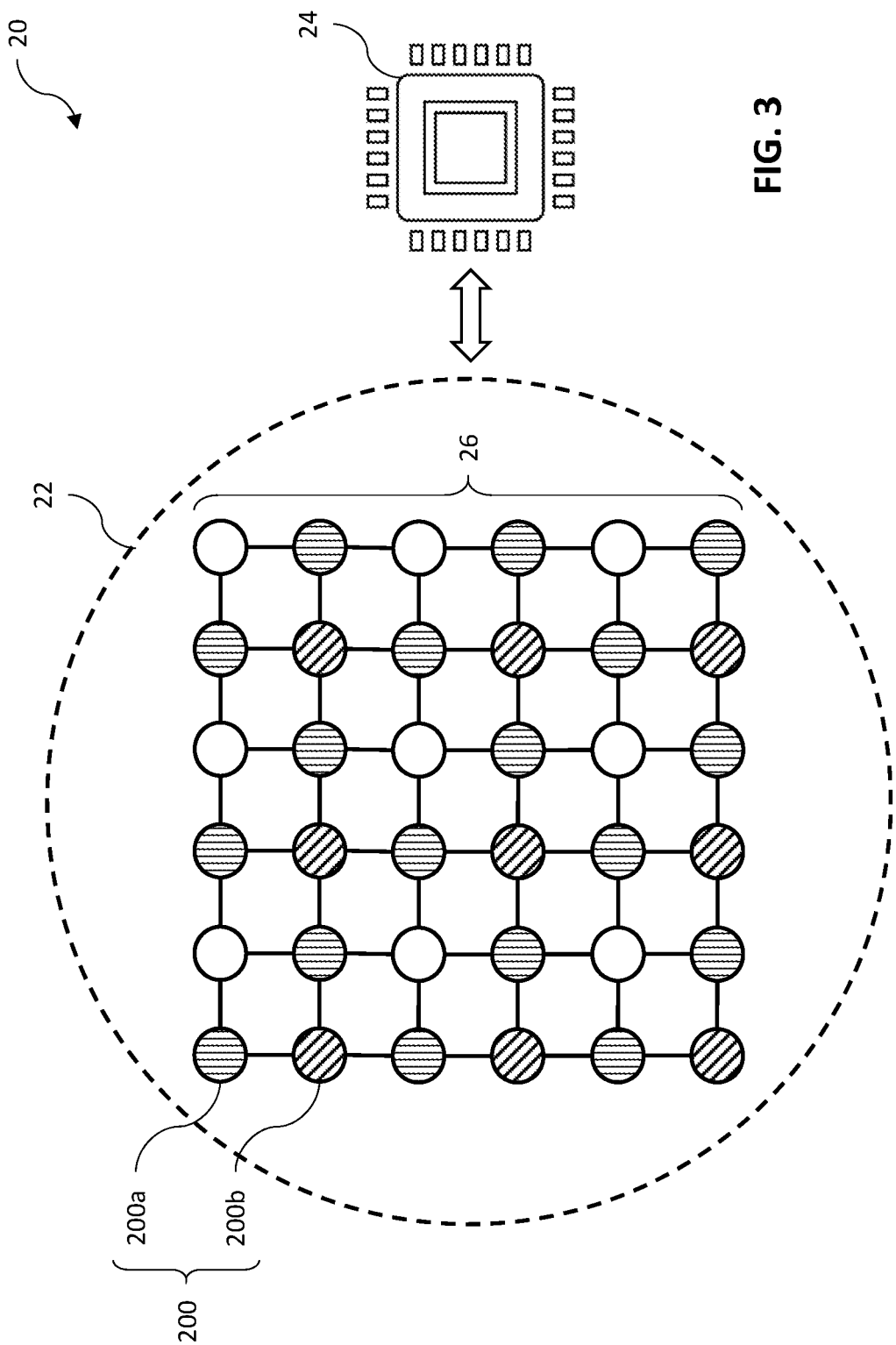
FIG. 3 illustrates a schematic diagram of a quantum computing system, according to some embodiments of the present disclosure.

FIG. 3 illustrates a schematic diagram of a quantum computing system 20, according to some embodiments of the present disclosure.

According to some embodiments, the quantum computing system 20 includes a quantum computational device 22 and a classical computer (e.g., a classical processor) 24, which are in communication with one another. For example, the classical computer 24 may provide the input data to the quantum computational device 22 for processing, and may receive the results of the quantum computations from the quantum computational device 22 as output data. For example, some portions of data processing may be performed by the quantum computational device 22 while other portions may be performed by the classical computer in a hybrid implementation. The quantum computational device 22 may include one or more quantum circuits 26, each of which may include a plurality of quantum bits (or qubits) 200 that may be arranged in a two-dimensional (2D) array or three-dimensional (3D) matrix. Each qubit 200 may communicate with its neighboring qubits and can be prepared in a specific state or be measured with readout ports. In some examples, the qubits 200 may include ancilla qubits 200a and computation qubits 200b.

According to some embodiments, the quantum-based clustering approach is implemented on a quantum device 22, in which one or more qubits 200 may be used to represent a node of a graph. However, embodiments of the present disclosure are not limited thereto, and an abstraction layer may define the relationship between nodes and qubits 200.

The Schrödinger equation in Hamiltonian form may be expressed as $$i\hbar \frac{\partial \psi}{\partial t} = H\psi,$$  Eq. (16)

By choosing the Hamiltonian as $H=\beta L$, the solution to the above equation is, $$\psi(t) = e^{-i\beta L t} \psi(0)$$  Eq. (17)

which expanding $\psi(0)$ in terms of the eigenvectors of the graph Laplacian L (as expressed in Equation 9) gives, $$\psi(t)=\Sigma_{j=1}^{N} C_j e^{i\beta \lambda_j t} v_j = \Sigma_{j=1}^{N} C_j v_j (\cos(\beta \lambda_j t) + i \sin(\beta \lambda_j t))$$  Eq. (18)

Thus, as noted about with reference to Equation 13, the evolution of the wavefunction depends on the eigenvalues and eigenvectors of the graph Laplacian L. In particular, the frequencies depend on the eigenvalues and the coefficients on the entries of the eigenvectors. Here, the evolution parameter is a design parameter that may be tweaked as desired for a given application.

Figure 4:
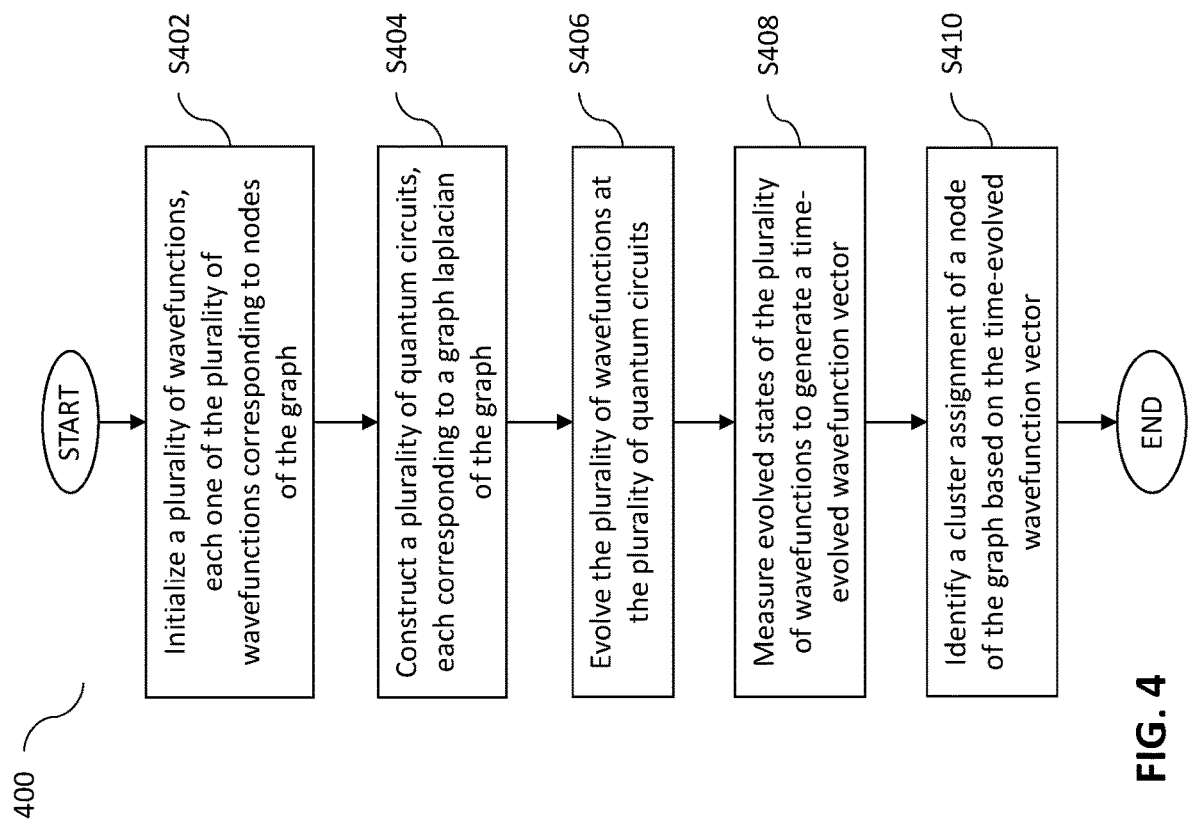
FIG. 4 illustrates a process of performing node cluster assignment in parallel by a quantum computing system, according to some embodiments of the present disclosure.

FIG. 4 illustrates a process 400 of performing node cluster assignment in parallel by a quantum computing system 20, according to some embodiments of the present disclosure.

In some embodiments, the quantum computing system 20 (e.g., the classical processor 24) initializes M independent wavefunctions (M being an integer greater than 1) such that each one of the wavefunctions is a vector whose dimension is equal to the number of nodes in the graph (S402). For a graph of N nodes (N being an integer greater than 1), each one of the wavefunctions includes a vector of N elements, which are each a function of time. In some embodiments, the wavefunctions are initialized to a same vector of random-valued elements $\psi_j(0)$ at time zero ($1 \leq j \leq M$).

The quantum computing system 20 (e.g., the quantum computational device 22) constructs a plurality of quantum circuits 26, each of which correspond to a graph Laplacian L of the graph (S404). This may involve creating, for each quantum circuit 26, a plurality of quantum gates that are configured to perform coherent quantum operations corresponding to the graph Laplacian L on quantum data (e.g., qubits 100). The quantum circuits 26 may be identically constructed.

The quantum computing system 20 then evolves (e.g., concurrently or simultaneously evolves) the independent wavefunctions $\psi_j$ at the quantum circuits 26, such that each one of wavefunction is evolved to a different time than other ones of the wavefunctions (S406). In some embodiments, the j-th wavefunction $\psi_j$ is evolved for j time steps $\Delta t$. For example, the first wavefunction is evolved by one time step to arrive at $\psi_1(\Delta t)$, the second wavefunction is evolved by two time steps to arrive at $\psi_2(2\Delta t)$, and the Mth wavefunction is evolved by M time steps to arrive at $\psi_M(M\Delta t)$. Here, $M\Delta t$ represents the maximum evolution time Tmax.

Once each wavefunction is evolved, the quantum computing system 20 measures the evolved states of the wavefunctions (i.e., $\psi_1(\Delta t), \psi_2(2\Delta t), \ldots, \psi_M(M\Delta t)$) to generate a time-evolved wavefunction vector (S408). It may do so by performing quantum state tomography on the quantum circuits 26 to detect values of the plurality of the wavefunctions and to generate the time-evolved wavefunction vector. The time-evolved wavefunction vector may be expressed as $[\psi(\Delta t), \psi(2\Delta t) \ldots \psi(Tmax)]$. As each wavefunction is an N-dimensional wavefunction, with each element corresponding to a different node, the time-evolved wavefunction vector includes N node-specific vectors, of which the jth vector corresponding to the j-th node can be expressed as $[\psi(\Delta t, j), \psi(2\Delta t, j) \ldots \psi(Tmax, j)]$. This information may be passed on to the classical computer 24 for further processing.

With this information, the quantum computing system 20 (e.g., the classical computer 24) may identify the cluster assignment of each node of the graph based on the time-evolved wavefunction vector (S410). Using spectral clustering, the classical computer 24 may estimate the eigenvalues and the j-th scaled components of the eigenvectors of the graph Laplacian based on the time-evolved wavefunction vector, and determine the cluster assignment of the node based on the eigenvalues and the j-th scaled components (e.g., signs of such components) of the eigenvectors of the graph Laplacian L. The quantum computing system 20 may perform an FFT on the time-evolved wavefunction vector corresponding to each of the nodes (e.g., [ψ(Δt, j), ψ(2Δt, j) . . . ψ(Tmax, j)]) to generate frequency domain wavefunctions for each node, may identify frequencies of the peaks of the resulting frequency domain wavefunctions, may estimate the eigenvalues as corresponding to the frequencies of the peaks, and calculate the scaled components of the eigenvectors based on the coefficients of the frequencies. The eigenvalues determine the number of clusters, and the signs of the scaled j-th components of the eigenvectors determine the cluster assignment of the j-th node.

As the process 400 of FIG. 4 relies on performing evolutions on M quantum circuits 26 (e.g., concurrently or simultaneously), a large number of qubits may be employed. Thus, while the parallel process may be performed quickly, this comes at the cost of system complexity.

Thus, according to some embodiments, the time-evolution and measurements of the quantum-based clustering approach are performed serially, rather than in parallel. While serial processing may produce slower results, it does result in a significant reduction on the number of qubits used in the quantum circuit 26, which may be desirable in some applications.

Figure 5:
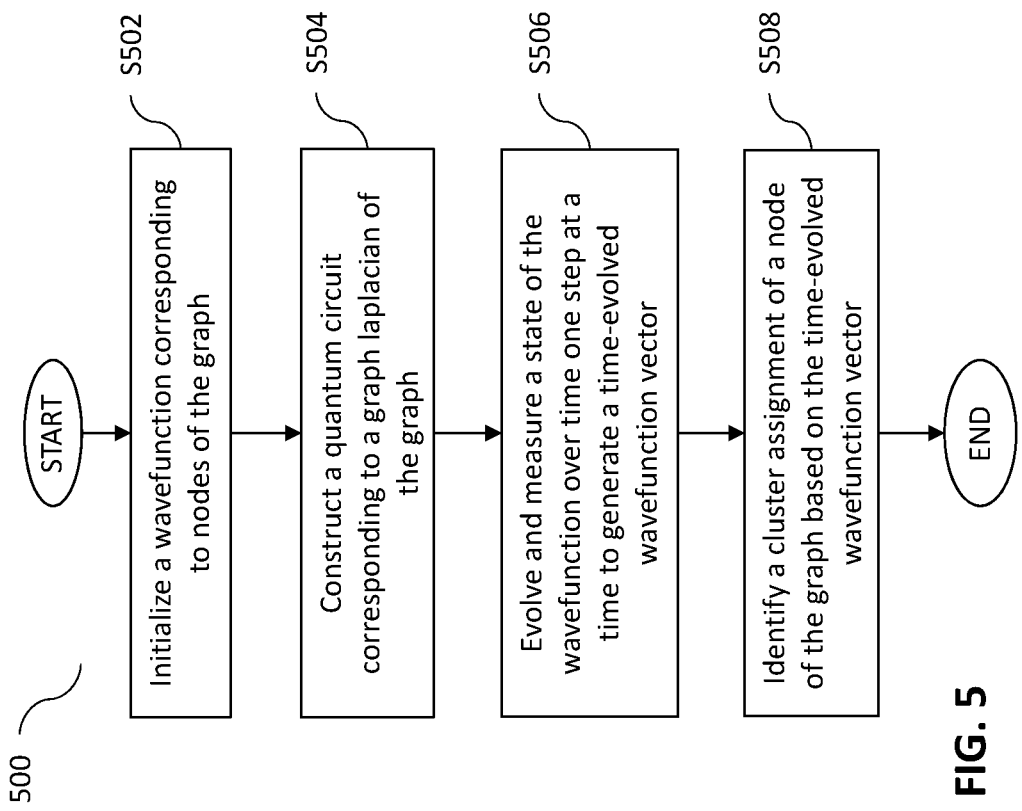
FIG. 5 illustrates a process of serially performing node cluster assignment by a quantum computing system, according to some embodiments of the present disclosure.

FIG. 5 illustrates a process 500 of serially performing node cluster assignment by a quantum computing system 20, according to some embodiments of the present disclosure.

In some embodiments, the quantum computing system 20 (e.g., the classical processor 24) initializes a wavefunction corresponding to nodes of the graph (S502). For a graph of N nodes (N being an integer greater than 1), the wavefunction includes a vector of N elements, which are each a function of time. In some embodiments, the wavefunction is initialized to a vector of random-valued elements ψ(0) at time zero.

The quantum computing system 20 (e.g., the quantum computational device 22) constructs a quantum circuit 26 that corresponds to a graph Laplacian L of the graph (S504). This may involve creating a plurality of quantum gates that are configured to perform coherent quantum operations corresponding to the graph Laplacian L on quantum data (e.g., qubits 100). Such a quantum circuit for a graph Laplacian can be constructed by encoding the vertices of the graph in binary and performing logical operations on the bits that correspond to moving between vertices (that the Laplacian encodes). For example, if the graph is a two-vertex graph with an edge between them, then the bit-flip gate encodes the adjacency matrix of this graph. This can be used to create the Laplacian.

The quantum computing system 20 then evolves and measures the state of the wavefunction ψ at the quantum circuit 26, one time step Δt at a time, for a total evolution time Tmax to generate a time-evolved wavefunction vector (S506). This evolution time Tmax may be an integer multiple of the time steps (e.g., Tmax=MΔt, where M is an integer greater than 1). The evolving and measuring the state of the wavefunction may include repeatedly performing the following: step-evolving the wavefunction p by one time step Δt; determining an evolved state of the wavefunction (e.g., using quantum tomography as described above with respect to FIG. 4) to generate an element of the time-evolved wavefunction vector (e.g., to generate an element of the vector ψ(jΔt)); and reinitializing the wavefunction to the evolved state (e.g., setting ψ(0) of the reinitialized wavefunction to the values of the N-dimensional vector ψ(jΔt) at step j). This process may be repeated M times (i.e., until the evolution time reaches Tmax), and the measurement results at each steps may be stored (e.g., at the classical computer 24) to generate the time-evolved wavefunction vector [ψ(Δt), ψ(2Δt) . . . ψ(Tmax)]. As each wavefunction is an N-dimensional wavefunction, with each element corresponding to a different node, the time-evolved wavefunction vector includes N node-specific vectors, of which the j-th vector corresponding to the j-th node can be expressed as [ψ(Δt, j), ψ(2Δt, j) . . . ψ(Tmax, j)].

With this information, the quantum computing system 20 (e.g., the classical computer 24) may identify the cluster assignment of each node of the graph based on the time-evolved wavefunction vector (S508). As noted above, using spectral clustering, the classical computer 24 may estimate the eigenvalues and eigenvectors of the graph Laplacian based on the time-evolved wavefunction vector, and determine the number of clusters and the cluster assignment of the node based on the eigenvalues and the eigenvectors of the graph Laplacian L, respectively.

Given that the process 500 relies on one quantum circuit (which is repeatedly reinitialized), rather than the M quantum circuits of process 400, far fewer qubits are utilized in serially performing the quantum-based node clustering. Further, as the quantum computer natively evolves the Hamiltonian, the process outlined above may be performed significantly faster than it would be on a classical computer, which performs the evolution numerically using digital circuits.

While the processes 400 and 500 that are described above rely on fault tolerant quantum computers that employ redundant qubits to correct errors (e.g., resulting from cross talk or environmental noise), embodiments of the present disclosure are not limited thereto. In some embodiments, spectral clustering may be performed using quantum approximate optimization algorithm (QAOA), which can produce approximate solutions for combinatorial optimization problems.

Let A be the adjacency matrix and D be the diagonal matrix with row sums of A i.e $D_{ii}=\Sigma A_{i,j}$ and $D_{ij}=0$, $i \neq j$. The row normalized adjacency matrix is $W=D^{-1}A$. The row normalized adjacency matrix W has one eigenvalue at $\lambda_1=1$ with eigenvector $v_1=\sqrt{N}[11 \ldots 1]^T$. By Gershgorin's theorem, all eigenvalues lie within $-1 \leq \lambda \leq 1$ and are real for undirected graphs. For purpose of spectral clustering, the second eigenvalue $\lambda_2$, which is closest to $\lambda_1=1$, and its corresponding eigenvector are of particular interest. Thus, consider the modified matrix, $$W_p = W - v_1 v_1^T \qquad \text{Eq. (19)}$$

The above matrix removes the spectral basis vector corresponding to the eigenvalue 1. Now the optimization problem becomes, $$\max \langle y|W_p|y \rangle \qquad \text{Eq. (20)}$$

where y=2z−1 (mapping from binary to {−Li}). Here y is a bit string and the above mapping gives z which corresponds to a string consisting of 1 or −1. Since y is not being relaxed to real values, the above maximization becomes $$\max 4z^T W_p z - 2 W_p z - 2 z^T W_p + A \qquad \text{Eq. (21)}$$

which when expressed in quadratic form becomes $$\max z^T Q z. \qquad \text{Eq. (22)}$$

QAOA may then be applied to obtain an estimate of the above quantity in Equation 22.

While one or more exemplary embodiments have been described with reference to the figures, it will be understood by those of ordinary skill in the art that various suitable changes in form and details may be made therein without departing from the spirit and scope as defined by the following claims, and equivalents thereof.

It will be understood that, although the terms "first", "second", "third", etc., may be used herein to describe various elements, components, and/or nodes, these elements, components, and/or nodes should not be limited by these terms. These terms are used to distinguish one element, component, or node from another element, component, or node. Thus, a first element, component, or node discussed below could be termed a second element, component, or node, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept." Also, the term "exemplary" is intended to refer to an example or illustration.

It will be understood that when an element, component, or layer is referred to as being "connected to" or "coupled to" another element or layer, it can be directly connected to or coupled to the other element or layer, or one or more intervening elements, components, or layers may be present. When an element or layer is referred to as being "directly on," "directly connected to" or "directly coupled to" another element, component, or layer, there are no intervening elements, component, or layers present.

As used herein, the terms "use," "using," and "used" may be considered synonymous with the terms "utilize," "utilizing," and "utilized," respectively.

The node, node processor, the quantum computing system, and classical computer (hereinafter collectively referred to as "processing devices"), and/or any other relevant devices or components according to embodiments of the present invention described herein may be implemented utilizing any suitable hardware, firmware (e.g. an application-specific integrated circuit, field programmable gate arrays, and/or the like), software, or a suitable combination of software, firmware, and hardware. For example, the various components of each of the processing devices may be formed on one integrated circuit (IC) chip or on separate IC chips. Further, the various components of each of the processing devices may be implemented on a flexible printed circuit film, a tape carrier package (TCP), a printed circuit board (PCB), or formed on a same substrate. Further, the various components of each of the processing devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A method for node cluster assignment in a graph, the method comprising:
   identifying neighboring nodes of a first node in the graph;
   calculating one or more elements of a graph Laplacian of the graph, the one or more elements of the graph Laplacian corresponding to the first node and the neighboring nodes;
   initializing a first wavefunction associated with the first node with an initial value;
   evolving the first wavefunction associated with the first node over time based on the initial value, the one or more elements of the graph Laplacian, and previous states of wavefunctions of the neighboring nodes to generate a time-evolved wavefunction vector; and
   identifying a cluster assignment of the first node based on a spectrum of the time-evolved wavefunction vector and eigenvalues of eigenvectors of the graph Laplacian, by removing the spectral basis vector corresponding to a first eigenvalue of an adjacency matrix of the graph.

2. The method of claim 1, wherein the calculating the one or more elements of the graph Laplacian comprises:
   calculating one or more elements of the adjacency matrix of the graph;
   calculating one or more elements of a diagonal degree matrix of the graph; and
   calculating the one or more elements of the graph Laplacian based on the one or more elements of the adjacency matrix and the one or more elements of the diagonal degree matrix.

3. The method of claim 1, wherein the initializing the first wavefunction associated with the first node with the initial value comprises:
   generating a random value as the initial value; and
   assigning the initial value to a corresponding element of the first wavefunction at time zero.

4. The method of claim 1, further comprising:
   receiving, from the neighboring nodes, the previous states of the wavefunctions of the neighboring nodes.

5. The method of claim 1, wherein the evolving the first wavefunction over time is further based on an evolution parameter.

6. The method of claim 1, wherein the evolving the first wavefunction over time comprises:
   calculating the first wavefunction at a second time $t_2$ via the following expression:

$$\psi(t_2, j) = \psi(t_1, j) + \Sigma_{k \in N(j)} i\beta L_{jk} \psi(t_1, k)$$

where $\psi(t_2, j)$ and $\psi(t_1, j)$ represent the first wavefunction at the second time $t_2$ and first time $t_1$, respectively, $N(j)$ represents a set of nodes neighboring the first node j, $\beta$ represents an evolution parameter, and $L_{jk}$ represents an element of the graph Laplacian corresponding to the first node j and a neighboring node k, and wherein the second time $t_2$ is one time step $\Delta t$ greater than the first time $t_1$.

7. The method of claim 1, wherein the time-evolved wavefunction vector is expressed as $$[\psi(0,j),\psi(\Delta t,j),\psi(2\Delta t,j) \ldots \psi(T\max,j)]$$

where $\psi(t,j)$ represents a value of the first wavefunction of the first node j at time t, $\Delta t$ represents an evolution time step, and Tmax represents a maximum evolution time.

8. The method of claim 1, wherein the identifying the cluster assignment of the first node comprises:
estimating the eigenvalues and one or more scaled components of eigenvectors of the graph Laplacian based on the time-evolved wavefunction vector; and
determining the cluster assignment of the first node based on the eigenvalues and the one or more scaled components of eigenvectors of the graph Laplacian.

9. The method of claim 8, wherein the estimating the eigenvalues and the one or more scaled components of the eigenvectors of the graph Laplacian comprises:
performing a Fourier transform of the time-evolved wavefunction vector to generate a frequency domain wavefunction;
identifying frequencies of peaks of the frequency domain wavefunction;
estimating the eigenvalues as corresponding to the frequencies of the peaks; and
calculating the one or more scaled components of the eigenvectors based on coefficients of the frequencies of the peaks.

10. The method of claim 8, wherein the determining the cluster assignment of the first node comprises:
identifying a number of clusters of the graph based on the eigenvalues of the graph Laplacian; and
assigning the first node to one of the clusters based on the one or more scaled components of the eigenvectors of the graph Laplacian.

11. The method of claim 1, wherein the graph represents a distributed computational system, and
wherein each of the first node and the neighboring nodes comprises an independent processor of the distributed computational system and a communication device.

12. A distributed computing system comprising:
a plurality of computational nodes interconnected as a graph, a first node of the plurality of computational nodes comprising:
a processor; and
a processor memory local to the processor, wherein the processor memory has stored thereon instructions that, when executed by the processor, cause the processor to perform:
identifying neighboring nodes of a first node from among the plurality of computational nodes;
calculating one or more elements of a graph Laplacian of the graph, the one or more elements of the graph Laplacian corresponding to the first node and the neighboring nodes;
initializing a first wavefunction associated with the first node with an initial value;
evolving the first wavefunction associated with the first node over time based on the initial value, the one or more elements of the graph Laplacian, and previous states of wavefunctions of the neighboring nodes to generate a time-evolved wavefunction vector; and
identifying a cluster assignment of the first node based on a spectrum of the time-evolved wavefunction vector and eigenvalues of eigenvectors of the graph Laplacian, by removing the spectral basis vector corresponding to a first eigenvalue of an adjacency matrix of the graph.

13. The distributed computing system of claim 12, wherein the calculating the one or more elements of the graph Laplacian comprises:
calculating one or more elements of the adjacency matrix of the graph;
calculating one or more elements of a diagonal degree matrix of the graph; and
calculating the one or more elements of the graph Laplacian based on the one or more elements of the adjacency matrix and the one or more of the diagonal degree matrix.

14. The distributed computing system of claim 12, wherein the initializing the first wavefunction associated with the first node with the initial value comprises:
generating a random value as the initial value; and
assigning the initial value to a corresponding element of the first wavefunction at time zero.

15. The distributed computing system of claim 12, further comprising:
receiving, from the neighboring nodes, the previous states of the wavefunctions of the neighboring nodes.

16. The distributed computing system of claim 12, wherein the evolving the first wavefunction over time is further based on an evolution parameter.

17. The distributed computing system of claim 12, wherein the evolving the first wavefunction over time comprises:
calculating the first wavefunction at a second time $t_2$ via the following expression:

$$\psi(t_2,j)=\psi(t_1,j)+ \Sigma_{k \in N(j)}^{\square} i\beta L_{jk}\psi(t_1,k)$$

where $\psi(t_2,j)$ and $\psi(t_1,j)$ represent the first wavefunction at the second time $t_2$ and first time $t_1$, respectively, N(j) represents a set of nodes neighboring the first node j, $\beta$ represents an evolution parameter, and $L_{jk}$ represents an element of the graph Laplacian corresponding to the first node j and a neighboring node k, and
wherein the second time $t_2$ is one time step $\Delta t$ greater than the first time $t_1$.

18. The distributed computing system of claim 12, wherein the time-evolved wavefunction vector is expressed as $$[\psi(0,j),\psi(\Delta t,j),\psi(2\Delta t,j) \ldots \psi(T\max,j)]$$

where $\psi(t,j)$ represents a value of the first wavefunction of the first node j at time t, $\Delta t$ represents an evolution time step, and Tmax represents a maximum evolution time.

19. The distributed computing system of claim 12, wherein the identifying the cluster assignment of the first node comprises:
estimating the eigenvalues and one or more scaled components of eigenvectors of the graph Laplacian based on the time-evolved wavefunction vector; and
determining the cluster assignment of the first node based on the eigenvalues and the one or more scaled components of the eigenvectors of the graph Laplacian.

20. The distributed computing system of claim 12, wherein the graph represents a distributed computational system, and
wherein each of the first node and the neighboring nodes comprises an independent processor of the distributed computational system and a communication device.

* * * * *